United States Patent [19]

Kurokawa

[11] Patent Number: 4,710,596

[45] Date of Patent: Dec. 1, 1987

[54] TELEPHONE UNIT ADAPTED FOR VERTICAL AND HORIZONTAL MOUNTING

[75] Inventor: Haruo Kurokawa, Liverpool, N.Y.

[73] Assignee: General Electric Company, Bridgeport, Conn.

[21] Appl. No.: 687,587

[22] Filed: Dec. 31, 1984

[51] Int. Cl.⁴ .................. H04M 1/02; H04M 1/04; H04M 1/08; H04M 11/00

[52] U.S. Cl. .................................. 379/424; 379/61; 379/435

[58] Field of Search .......... 179/100 R, 100 C, 100 D, 179/178, 159, 158 R, 103, 2 EA

[56] References Cited

U.S. PATENT DOCUMENTS

| | | | |
|---|---|---|---|
| 2,640,109 | 5/1953 | O'Neil | 179/100 C |
| 2,654,811 | 10/1953 | Boswau et al. | 179/100 C |
| 2,949,509 | 8/1960 | Whidden | 179/100 C |
| 3,073,911 | 1/1963 | Mattke et al. | 179/100 C |
| 3,303,291 | 2/1967 | Schoemann | 179/100 C |
| 3,878,343 | 4/1975 | Van De Wall | 179/100 C |
| 4,107,481 | 8/1978 | Redshaw | 179/100 C |
| 4,188,512 | 2/1980 | Lord | 179/100 C |
| 4,395,591 | 7/1983 | Kaczkos | 179/100 R |
| 4,511,761 | 4/1985 | Yamazaki et al. | 179/2 EA |

FOREIGN PATENT DOCUMENTS

| | | | |
|---|---|---|---|
| 0057658 | 8/1982 | European Pat. Off. | 179/103 |
| 2920262 | 11/1980 | Fed. Rep. of Germany | 179/100 C |

OTHER PUBLICATIONS

"Switched Capacitor Interface Circuit for Capacitive Transducers" by Yeh et al., presented at the 1985 International Conference on Solid State Sensors and Actuators.

Primary Examiner—Thomas W. Brown
Assistant Examiner—Danita R. Byrd
Attorney, Agent, or Firm—Carlos Nieves; Peter M. Emanuel; Thomas F. Lenihan

[57] ABSTRACT

A telephone unit is adapted for mounting in either a vertical or a horizontal mode. In the vertical mode, the telephone cradle includes an upwardly extending hook member which projects into the space occupied by the handset to engage a downwardly facing recess in the handset to support the handset in a fixed position. In the horizontal mode, the hook member is retracted from the space occupied by the hook member, and a movable wall is positioned to bias the handset into the same fixed position relative to the cradle.

7 Claims, 6 Drawing Figures

TELEPHONE UNIT ADAPTED FOR VERTICAL AND HORIZONTAL MOUNTING

BACKGROUND OF THE INVENTION

1. Field of the Invention

This invention relates to a telephone unit adapted for mounting in vertical and horizontal modes and, more particularly, to a telephone handset and cradle configuration which not only securely holds and readily releases a telephone handset in both mounting modes, but also precisely positions the handset in a fixed position relative to the cradle in both mounting modes.

2. Description of the Prior Art

It is desirable that it be possible to use the same telephone unit as either a wall unit or a desk unit. Such a capability eliminates the need for a manufacturer to produce distinct telephone products for vertical and horizontal mounting and the need for dealers and telephone companies to stock multiple products that are otherwise identical. In addition, such a product will enable the consumer to change telephone locations and mounting modes as desired without having to purchase a new telephone.

One of the problems encountered in providing a telephone for both horizontal and vertical mounting is how to support the handset on the cradle or base. It is, of course, essential that the handset be received by the cradle in a manner that provides secure support and ready release of the handset in both mounting modes. With respect to cordless telephones, in which the cradle not only supports the handset but also provides charging of the handset batteries when supporting the handset, it is essential that the handset and the cradle be maintained in the same relative positions. More particularly, in order to assure proper electrical contact between the charging contacts of the cradle and the handset, it is essential that the handset be mounted in the same precise, fixed postion relative to the cradle in both mounting modes.

In both mounting modes, the weight of the handset is the force used to maintain the handset on the cradle. As the position of the cradle changes between horizontal and vertical, the direction relative to the cradle in which the weight force acts also changes. It is therefore necessary that the handset and the cradle have complementary configurations to assure that the weight force is utilized in both mounting modes to move the handset to the identical location relative to the cradle. It has been known heretofore that secure mounting in the vertical mode can be provided by means of a hook extending from the cradle in an upward direction to engage a complementary downwardly facing recess in the handset, the weight of the handset causing the handset to move downwardly to a fully seated position on the hook. If, however, such a cradle is mounted in the horizontal mode, the weight of the handset will act in a direction generally transverse to the direction of the hook, and the weight alone of the handset will not cause the handset to move to the fully seated position relative to hook. Other means, such as an inclined wall, could be provided to bias the handset into the fully seated position. If this is done, however, the biasing means may interfere with removal of the handset from the cradle. It has therefore been recognized in the past that it may be necessary to remove the hook in the horizontal mode to permit easy removal of the handset from the cradle.

SUMMARY OF THE INVENTION

It is therefore an object of the invention to provide an improved telephone unit for horizontal and vertical mounting in which the handset is positioned in a precise position relative to the cradle in both mounting modes.

Another object of the invention to provide a telephone unit that may be easily adjusted for horizontal and vertical mounting by the user.

Yet another object of the invention is to provide means for secure and precise mounting of the handset in each mounting mode that does not interfere with mounting or removal of the handset in the other mounting mode.

Briefly stated, in carrying out the invention in one form, a telephone unit adapted for mounting in both vertical and horizontal modes comprises a handset having a predetermined configuration and a cradle having stationary wall means at least partially forming a complementary configuration for receiving and supporting the handset in a fixed position relative thereto. The predetermined configuration of the handset includes a downwardly facing recess therein when the telephone unit is mounted in its vertical mode. A hook member is movable between a first position in which portion of the hook member projects from the stationary wall means into the space occupied by the handset recess when the handset is received in the fixed position and a second position in which no portion of the hook member projects into the space occupied by the handset recess. A movable wall means is movable between a first position spaced substantially from the space occupied by the handset when the handset is received in the fixed position relative to the cradle and a second position adjacent the space occupied by the handset. The hook member and the movable wall means are coupled such that the hook member and the movable wall means may be selectively moved by a user in unison in either direction between their respective first and second positions, and a locking means is provided for selectively locking the hook member and the movable wall means in either of their respective first and second positions. The orientation of the handset recess and the hook member in its first position are such that when the telephone unit is mounted in its vertical mode and the handset is placed on the cradle the weight of the handset causes the handset to move downwardly with the hook member received in the handset recess to the fixed position. The orientation of the handset and the movable wall means in its second position are such that when the telephone unit is mounted in its horizontal mode and the handset is placed on the cradle the weight of the handset causes the handset to move downwardly in engagement with the movable wall means to the fixed position of the handset relative to the cradle.

In accordance with a further aspect of the invention, the telephone unit further comprises battery means in the handset, a first battery charging contact means on an exterior surface of the handset, and a second battery charging contact means on an exterior surface of the cradle. The first and second contact means are positioned on the handset and the cradle such that electrical engagement is maintained therebetween when the handset is received in the fixed position relative to the cradle. Further, the movable wall means in its second position comprises an inclined surface that engages a complementary portion of the handset to bias the handset horizontally into the fixed position relative to the cradle when the telephone unit is mounted in its horizontal mode. The coupling means preferrably comprises an articulated link member secured to the movable wall means at a first end thereof. The link member is pivotally connected to the hook member at a first end thereof and to the cradle at an intermediate point thereof. A biasing means is provided for biasing the hook member and the movable wall means to their respective second positions. In accordance with still further aspects of the invention, the pivotal connection between the hook member and the link member is at a point intermediate the ends of the hook member. A first end only of the hook member comprises the portion thereof that projects into the space occupied by the handset recess when the handset is received in the fixed position relative to the cradle and the hook member is in its first position. The stationary wall means of the cradle includes means for engaging the other end of the hook member to pivot the hook member about the second end of the link member when the movable wall means is moved between its first and second positions. The biasing means of the coupling means comprises first spring means interconnecting the link member and the cradle and second spring means interconnecting the link member and the hook member.

BRIEF DESCRIPTION OF THE DRAWINGS

While the novel features of the invention are set forth with particularity in the appended claims, the invention, both as to organization and content, will be better understood and appreciated, along with other objects and features thereof, from the following drawings, in which:

DESCRIPTION OF A PREFERRED EMBODIMENT

Figure 1:
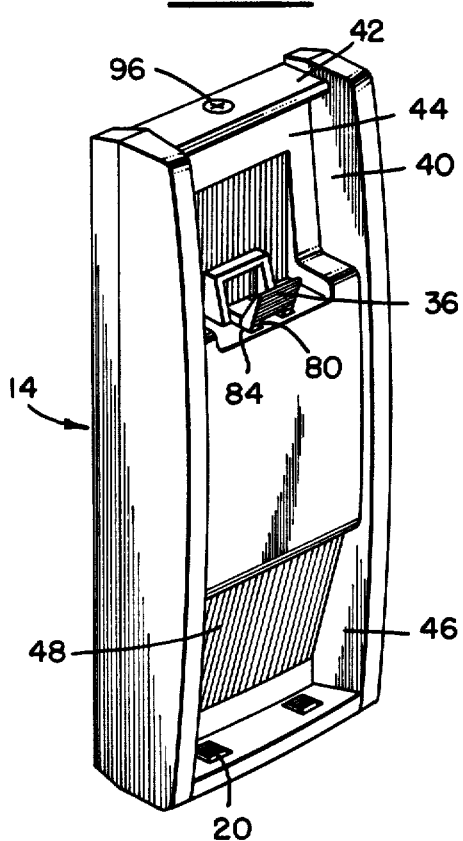
FIG. 1 is perspective view of the cradle of the telephone unit of the invention, the cradle being illustrated in the vertical mounting mode.
Figure 2:
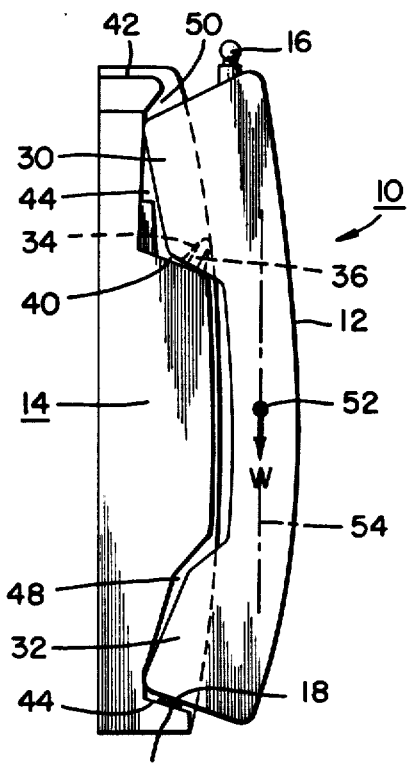
FIG. 2 is a side view, partially cut away, of the cradle of FIG. 1 showing a handset received therein in the vertical mounting mode.
Figure 3:
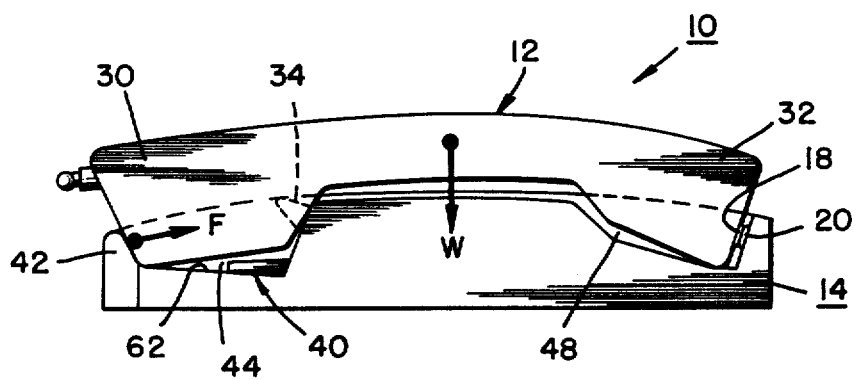
FIG. 3 is a side view, partially cut away, of the cradle and handset of FIG. 2 shown in the horizontal mounting mode.

Referring first to FIGS. 1-3, a telephone unit 10 includes a handset 12 and a cradle 14 for receiving the handset 12 when the telephone unit 10 is mounted either vertically as illustrated by FIG. 2 or horizontally as illustrated by FIG. 3. Although the present invention is not limited to cordless telephones, the illustrated telephone unit 10 is a cordless unit in which the handset 12 has a transceiver therein for communication with a base station, a telescopic antenna 16, and charging contacts 18 for charging the transceiver batteries in the handset 12 when the handset 12 is received in the cradle 14. A mating pair of charging contacts 20 are located on the cradle 14, and it is essential that the contacts 18 engage the contacts 20 whenever the handset 12 is received in the cradle 14 so that the handset batteries will be maintained in their fully charged condition. If the contacts 18 and 20 are not maintained in their engaged condition, the batteries will not be continually charged, and the telephone unit 10 may not operate when the handset 12 is removed from the cradle 14 to place or receive a call. To assure contact between the contacts 18 and 20, the handset 12 must be located in the same fixed position relative to the cradle 14 when the telephone unit is mounted in both its horizontal and vertical modes. The present invention assures that the required positioning will be maintained in both modes while also assuring that the cradle 14 will securely hold and readily release the handset 12.

As illustrated, the handset 12 is an elongated member having projecting ear and mouth portions 30 and 32, respectively, at opposite ends thereof, the handset 12 being contoured to fit comfortably between the typical user's ear and mounth during use. The handset ear portion 30 has a recess 34 therein adapted to receive a hook member 36 in a manner hereinafter described. When the telephone unit 10 is mounted in its vertical mode as illustrated by FIG. 2, the recess 34 opens in a downwardly facing direction.

The cradle 14 is designed to provide a complementary configuration for receiving and supporting the handset 12. The cradle 14 includes stationary wall structure 40 which cooperates with a movable wall 42 to define a recess 44 for receiving the handset ear portion 30. Similarly, stationary wall structure 46 defines a recess 48 for receiving the handset mouth portion 32, the wall structure 46 also supporting the cradle contacts 20. The sidewall portions of the stationary wall structures 40 and 46, clearly illustrated by FIG. 1, are cut away in FIGS. 2 and 3 to more clearly show the reception of the ear and mouth portions 30 and 32 in the recesses 44 and 48, respectively.

In accordance with the invention, the movable wall member 42 may be moved by the user between a first position illustrated by FIG. 2 and a second position illustrated by FIG. 3. The hook member 36 is coupled to the movable wall member 42 such that movement of the wall member between its first and second positions causes the hook member 36 to move to the respective positions illustrated by FIGS. 2 and 3. With reference to FIGS. 1-3, operation of the invention will be described generally without reference to the details of the manner by which the movable wall member 42 and the hook member 36 are interconnected by a preferred form of coupling means. Such details will be described hereinafter. Thus, when the wall member 42 is positioned in its first position as illustrated by FIG. 2, the wall member 42 is spaced substantially from the space occupied by the ear portion 30 of the handset 12, the spacing being indicated generally by the numeral 50. The hook member 36 is simultaneously positioned such that it projects from the stationary wall means 40 in a generally upward direction into the space occupied by the ear portion 30 of the handset 12. More particularly, the hook member 36 in its first position extends into the downwardly facing recess 34 in the handset 12. When the handset 12 is positioned in the cradle 14 as illustrated by FIG. 2, the total weight W of the handset 12 acts downwardly through its center of gravity 52 along a line of action 54 spaced from the recess 34 such that the handset 12 is caused to pivot about the hook member 36 in a clockwise direction, the contacts 18 at the lower end of the mouth portion 32 swinging into the recess 48 into engagement with the contacts 20. The depth of the handset recess 34 and the extent of the projection of the hook member 36 are jointly selected to assure that the lower end of the mouth portion 30 and the contacts 18 are precisely positioned to make electrical contact with the contacts 20. When the movable wall member 42 and the hook member 36 are in their respective first positions as illustrated by FIG. 2, the spacing 50 between the wall member 42 and the handset 12 is such that the handset 12 may be placed on the hook member 36 and removed therefrom without any interference between the wall member 42 and the handset ear portion 30.

When it is desired to mount the telephone unit in the horizontal mode, the movable wall member 42 and the hook member 36 are moved to their second positions as illustrated by FIG. 3. In this mode, the hook member 36 is retracted to a position flush with the back, or bottom, wall 62 of the cradle recess 44 such that it is totally retracted from the space occupied by the handset ear portion 30. The wall member 42 is positioned at an inclined angle immediately adjacent the space occupied by the ear portion 30 such that it will horizontally bias and guide the ear portion 30 into the recess 44. More particularly, the movable wall member 42 is positioned and inclined to exert a force F on the ear portion 30 as the handset 12 is lowered into the cradle 14, the force F being directed toward the mouth portion 32 such that the force F in combination with the weight W of the handset 12 causes the contacts 18 to engage the contacts 20. Although the space 50 of FIG. 2 is completely eliminated in the horizontal mounting mode of FIG. 3, there is no interference with easy placement and removal of the handset 12 since the hook member 36 does not enter the recess 34 or otherwise interfere with the handset 12. In this manner, the handset 12 is positioned in the same fixed position relative to the cradle 14 in the horizontal mode as it is in the vertical mode.

The preferred coupling means for the hook member 36 and the movable wall member 42 will now be described with particular reference to FIGS. 4-6. As illustrated therein, a fixed metal mounting bracket 60 is secured within the cradle 14 below the recess 44 and its bottom wall 62. The bracket 60 includes a pair of upstanding supports 66 on opposite sides of the recess 44, the supports 66 being located within the body of the cradle 14 outside of the sidewalls of the recess 44. At their upper ends, the supports 66 terminate in semicircular support edges 68 for pivotally supporting cylindrical trunnions 70 on a pair of link elements 72. Each of the link elements 72 is rigidly secured to the movable wall 42 at a first end thereof. At their opposite ends, the link elements 72 are rigidly secured to a cross link 74 such that the movable wall 42, the links 72, and the cross link 74 form a generally rectangular structure surrounding the recess 44. The wall member 42 is an external element actually defining a portion of the recess while the link means comprising the links 72 and 74 are internal elements disposed within the stationary wall structure 40. The cross link 74 has a pair of upstanding support arms 76 thereon at a central location thereof, the support arms 76 pivotally connected to a pair of extensions 80 of the hook member 36 on a horizontal axis 82. The extensions 80 extend in one direction from the support arms 76 and the axis 82 to the hook member 36 through slots 84 (FIG. 1) in the wall structure 40 and in the other direction to terminal ends 86 spaced substantially from the support arms and the axis 82. The purpose of the extensions 80 will become clear as this description proceeds.

Figure 4:
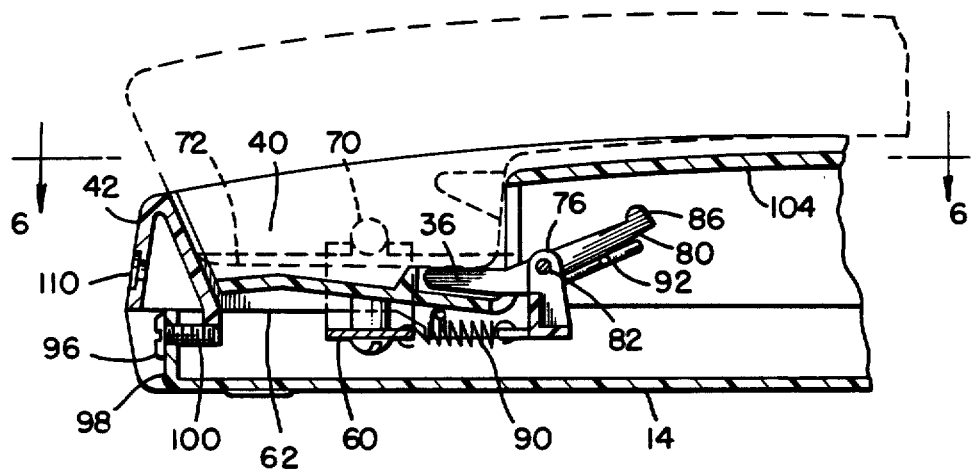
FIG. 4 is a view of a portion of the cradle and handset as illustrated by FIG. 3, the cradle being shown in cut-away form and the handset being shown in phantom to illustrate the hook member, the movable wall means, and the coupling means in their horizontal mounting mode positions.
Figure 5:
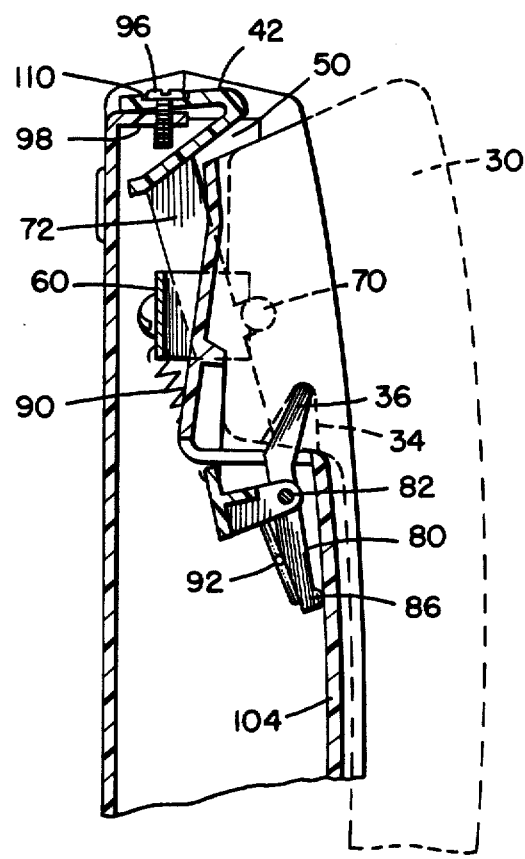
FIG. 5 is a view similar to FIG. 4 showing the hook member, the movable wall means, and the coupling means in their vertical mounting mode positions.
Figure 6:
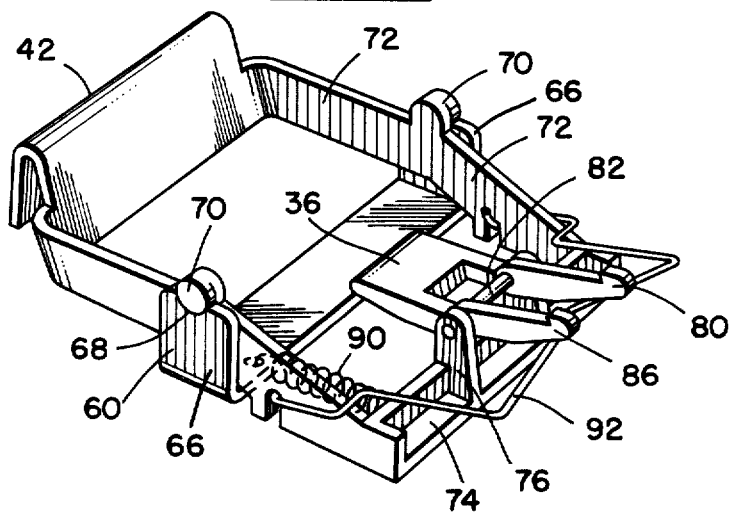
FIG. 6 is a perspective view of the hook member, the movable wall means, and the coupling means.

Still referring primarily to FIGS. 4-6, a spring 90 is connected in tension between the fixed mounting bracket 60 and the cross link 72, the action of the spring 90 being to rotate the link elements and the movable wall 42 about the axis of the trunnions 70 to the positions shown by FIG. 4. A wire spring 92 is connected between the link elements 72 and the extensions 80 of the hook member 36 to bias the hook member 36 and the extensions 80 about the axis 82 to the positions shown by FIG. 4. When the springs 90 and 92 bias the elements to the positions of FIG. 4, the movable wall member 42 and the hook member 36 are positioned in their respective second positions as described above. To maintain the elements in the positions of FIG. 4, a screw 96 is screwed into an end wall 98 of the cradle 14 such that its inner end 100 extends beneath the wall member 42 to prevent downward movement of the wall member 42. The telephone unit 10 in this condition is suited for use in the horizontal mode as described above.

When, however, use of the telephone unit 10 in the vertical mode is desired, the screw 96 is removed, and the wall member 42 is forced downwardly against the biasing action of the spring 90 to the position illustrated by FIG. 5. As the wall member 42 is moved downwardly, the link elements 72 pivot about the trunions 70, and the support arms 76 move upwardly toward the undersurface 104 of the stationary wall structure of the cradle 14. The terminal ends 86 of the hook extensions 80 engage the undersurface 104, and continued upward movement of the support arms 76 causes the extensions 80 to pivot about the axis 82 against the biasing action of the spring 92. When the movable wall member 42 reaches its first position as illustrated by FIG. 5, the hook member 36 has been pivoted about the axis 82 to its respective first position. To maintain the elements in the positions of FIG. 5, the screw 96 is inserted through an opening 110 in the wall 42 and is screwed into the end wall 98 of the cradle 14. In this position, upward movement of the wall 42 is prevented. The telephone unit in this condition is suited for use in the vertical mode as described above.

From the foregoing, it wll be seen that the present invention provides an improved telephone unit for horizontal and vertical mounting in which the handset is positioned in a precise position relative to the cradle in both mounting modes. The telephone unit may be easily adjusted for use in the two mounting modes, and the telephone unit provides secure and precise mounting of the handset in each mounting mode without interferring with mounting or removal of the handset in the other mounting mode.

While the invention has been particularly shown and described with reference to a preferred embodiment thereof, it will be understood by those skilled in the art that various changes in form, details, and application may be made therein without departing from the spirit and scope of the invention. For example, the coupling mechanism described herein may be replaced by equivalent mechanisms for jointly moving the wall 42 and the hook member 36 in the manner described. Similarly, the invention may be applied equally well to cordless and corded telephones. Accordingly, it is intended that all such modifications and changes be included within the scope of the appended claims.

What is claimed as new and is desired to secure by Letters Patent of the United States is:

1. A telephone unit adapted for mounting in vertical and horizontal modes, said telephone unit comprising:
   a handset having a predetermined configuration,
   a cradle including stationary wall means at least partially forming a complementary configuration for receiving and supporting said handset in a fixed position relative thereto,
   the predetermined configuration of said handset including a downwardly facing recess therein when the telephone unit is mounted in its vertical mode,
   a hook member movable between a first position in which a portion of said hook member projects from said stationary wall means into a space occupied by said handset recess when said handset is received in said fixed position relative to said cradle and a second position in which no portion of said hook member projects into the space occupied by said handset recess when said handset is received in said fixed position relative to said cradle,
   a movable wall means movable between a first position spaced substantially from the space occupied by said handset when said handset is received in said fixed position relative to said cradle and a second position adjacent the space occupied by said handset when said handset is received in said fixed position relative to said cradle,
   means coupling said hook member and said movable wall means such that said hook member and said movable wall means may be selectively moved by a user in unison in either direction between their respective first positions and their respective second positions,
   and locking means for selectively locking said hook member and said movable wall means in either of their respective first and second positions,
   the said handset recess and said hook member having an orientation in its first position such that when the telephone unit is mounted in its vertical mode and said handset is placed on said cradle the weight of said handset causes said handset to move downwardly with said hook member received in said handset recess to said fixed position of said handset relative to said cradle, and an orientation of said handset and said movable wall means in its second position being such that when the telephone unit is mounted in its horizontal mode and said handset is placed on said cradle the weight of said handset causes said handset to move downwardly in engagement with said movable wall means to said fixed position of said handset relative to said cradle,
   whereby a user may move said hook member and said movable wall means to their respective first positions whe mounting of the telephone in its vertical mode is desired and said hook member and said movable wall means to their respective second positions when mounting of the telephone in its horizontal mode is desired.

2. A telephone unit as defined by claim 1 further comprising:
   battery means in said handset,
   first battery charging contact means on an exterior surface of said handset, said first contact means coupled to said battery means for supplying charging current thereto,
   and second battery charging contact means on an exterior surface of said cradle,
   said first and second contact means being positioned on said handset and said cradle such that electrical engagement is maintained therebetween when said handset is received in said fixed position relative to said cradle.

3. A telephone unit as defined by claim 1 in which said movable wall means in its second position comprises an inclined surface that engages a complementary portion of said handset to bias said handset horizontally into said fixed position relative to said cradle when the telephone unit is mounted in its horizontal mode.

4. A telephone unit as defined by claim 3 in which said coupling means comprises:
   a link member secured to said movable wall means at a first end thereof,
   means pivotally connecting said link member to said hook member at a second, opposite end thereof,
   means intermediate said first and second ends of said link member pivotally connecting said link member to said cradle,
   and means biasing said hook member and said movable wall means to their respective second positions.

5. A telephone unit as defined by claim 4 in which the pivotal connection between said hook member and said link member is at a point intermediate the ends of said hook member, a first end only of said hook member comprising the portion thereof that projects into the space occupied by said handset recess when said handset is received in said fixed position relative to said cradle and said hook member is in its first position, said stationary wall means of said cradle including means for engaging the other end of said hook member to pivot said hook member about the second end of said link member when said movable wall means is moved between its first and second positions.

6. A telephone unit as defined by claim 5 in which said biasing means of said coupling means comprises first spring means interconnecting said link member and said cradle and second spring means interconnecting said link member and said hook member.

7. A telephone unit as defined by claim 6 further comprising:
   battery means in said handset,
   first battery charging contact means on an exterior surface of said handset, said first contact means coupled to said battery means for supplying charging current thereto,
   and second battery charging contact means on an exterior surface of said cradle,
   said first and second contact means being positioned on said handset and said cradle such that electrical contact is maintained therebetween when said handset is received in said fixed position relative to said cradle.

* * * * *

UNITED STATES PATENT AND TRADEMARK OFFICE
CERTIFICATE OF CORRECTION

PATENT NO.  : 4,710,596

DATED       : December 1, 1987

INVENTOR(S) : Haruo Kurokawa

It is certified that error appears in the above-identified patent and that said Letters Patent is hereby corrected as shown below:

Column 7, line 37, that portion reading "the said handset" should read -- said handset --. Column 7, line 55, that portion reading "tions whe mounting" should read -- tions when mounting.

Signed and Sealed this

Twenty-first Day of June, 1988

*Attest:*

DONALD J. QUIGG

*Attesting Officer*    *Commissioner of Patents and Trademarks*